US008350667B2

(12) United States Patent
Ferstl

(10) Patent No.: US 8,350,667 B2
(45) Date of Patent: Jan. 8, 2013

(54) METHOD FOR STARTING UP A LIGHTING SYSTEM

(75) Inventor: Peter Ferstl, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 339 days.

(21) Appl. No.: 12/674,571

(22) PCT Filed: Jun. 19, 2008

(86) PCT No.: PCT/EP2008/057775
§ 371 (c)(1), (2), (4) Date: Feb. 22, 2010

(87) PCT Pub. No.: WO2009/027129
PCT Pub. Date: Mar. 5, 2009

(65) Prior Publication Data
US 2011/0130851 A1 Jun. 2, 2011

(30) Foreign Application Priority Data
Aug. 24, 2007 (DE) ........................ 10 2007 040 111

(51) Int. Cl.
*G05B 23/00* (2006.01)

(52) U.S. Cl. ........................................ 340/5.22; 340/5.2

(58) Field of Classification Search .......... 315/291–294, 315/298, 307, 308, 185 R, 185 S, 314–319, 315/323–324, DIG. 4; 340/5.1, 5.2, 5.21, 340/5.22, 5.23
See application file for complete search history.

(56) References Cited

U.S. PATENT DOCUMENTS 5,866,992 A 2/1999 Geiginger et al. .............. 35/294
7,042,173 B2 * 5/2006 Huber ........................... 315/318
(Continued)

FOREIGN PATENT DOCUMENTS

DE 10323690 12/2004
(Continued)

OTHER PUBLICATIONS

International Search Report and Written Opinion for Application No. PCT/EP2008/057775 (12 pages), Mar. 12, 2008.

*Primary Examiner* — Minh D A
(74) *Attorney, Agent, or Firm* — King & Spalding L.L.P.

(57) ABSTRACT

A method for the start-up of a lighting system having lamps and a central control system, wherein each lamp has an identification code independently of its position and a position code assigned by a control device, has the following steps: a) Separating the lamps into two groups by putting one group in a first state and the other group in a second state, b) selecting one of the lamps and entering its state into the operating device selecting the group of lamps that has the same state as the selected lamp for further steps, while the other group is no longer considered, d) when the selected group does not only have the selected lamp, the steps a)-d) are carried out again e) assigning the position code to the remaining lamp, to bring the code directly into relation with the identification code, f) carrying out the steps a)-e) for further lamps.

20 Claims, 2 Drawing Sheets

U.S. PATENT DOCUMENTS

| | | | | |
|---|---|---|---|---|
| 7,061,396 | B1 * | 6/2006 | Conrad et al. | 340/8.1 |
| 7,075,253 | B2 * | 7/2006 | Huber | 315/307 |
| 7,221,276 | B2 * | 5/2007 | Olsen et al. | 340/572.1 |
| 2004/0160199 | A1 | 8/2004 | Morgan et al. | 315/312 |
| 2004/0232856 | A1 | 11/2004 | Huber | 315/291 |
| 2006/0049935 | A1 | 3/2006 | Giannopoulos et al. | 340/533 |
| 2006/0109203 | A1 | 5/2006 | Huber et al. | 345/39 |
| 2006/0193125 | A1 * | 8/2006 | Fluss | 362/145 |
| 2007/0121323 | A1 | 5/2007 | Pawlik et al. | 362/253 |
| 2008/0218087 | A1 | 9/2008 | Crouse et al. | 315/131 |
| 2011/0130851 | A1 | 6/2011 | Ferstl | |

FOREIGN PATENT DOCUMENTS

| | | | |
|---|---|---|---|
| DE | 102004037653 | | 2/2006 |
| DE | 102004055933 | | 5/2006 |
| DE | 102006019144 | | 11/2006 |
| RU | 51328 | U1 | 1/2006 |
| WO | 9600459 | | 1/1996 |
| WO | 2007029186 | | 3/2007 |
| WO | 2009/027129 | A1 | 3/2009 |

* cited by examiner

METHOD FOR STARTING UP A LIGHTING SYSTEM

CROSS-REFERENCE TO RELATED APPLICATIONS

This application is a U.S. National Stage Application of International Application No. PCT/EP2008/057775 filed Jun. 19, 2008, which designates the United States of America, and claims priority to German Application No. 10 2007 040 111.8 filed Aug. 24, 2007, the contents of which are hereby incorporated by reference in their entirety.

TECHNICAL FIELD

The invention relates to a method for starting up a lighting system having a plurality of lamps and a central control system for actuating the lamps.

BACKGROUND

DE 10 2004 055 933 A1 discloses a method for allocating abbreviated addresses in lighting installations, the lighting components of which are controlled by way of a DALI bus. DALI is the abbreviation for Digital Address of the Lighting Interface and signifies a standard protocol for component communication in a lighting installation. In building technology the conventional connection technology for lighting means is substantially replaced by electronic lighting systems, which contain a data bus and/or can be connected to a data bus. Such lighting systems contain at least one control device, to which a number of operating devices, in particular in the form of electronic ballasts, can be connected. These operating devices are in turn connected to the actual lighting means and serve to actuate them. In particular if the lighting system is designed for quite a large building, for example an office building, its start-up is associated with a certain outlay. Unique addressing and channel association have to be carried out for every operating device or each lighting means connected therein, being stored in the respective operating device and in the control system as start-up data. To ensure correct identification and association of the individual lighting means it may be necessary in this context for the start-up fitter to switch on each lighting means individually, locate its precise position within the building and register it in the control device. This procedure is time-consuming and also means that the lighting system cannot be operated in the process.

It is therefore proposed that a location facility should be provided for the location-dependent allocation of abbreviated addresses. This location facility is used to locate an active lighting component and register it with the control system for allocation of an abbreviated address. Location here takes place by way of a radio chip which transmits a radio signal during activation of the lamp, the chips being numbered so that the radio signal can be associated uniquely with a lamp. Such a system disadvantageously requires all the lamps to be provided with a coordinated chip system.

A comparable solution is also demonstrated in DE 10 2006 019 144 A1.

A method for starting up a lighting system is disclosed in DE 10 2004 037 653 A1. The lighting system comprises a control device with a number of operating devices connected to the control device. The control device is connected to a start-up device. An addressing and a channel of the control device are associated with each operating device. These address/channel associations are stored as start-up data in the control device. The start-up data is written back from the control device into the start-up device and stored in a database there, so that it can be protected against data loss and is available for a new start-up.

A light installation is disclosed in DE 103 23 690 A1. Lamps in the light installation are provided with codes that can be addressed from outside by means of signals by way of their respective ballasts. These codes are read out during installation of the light installation and fed to a control device. The control device has to associate the ballasts or lamps with their respective installation positions. One disadvantage of this embodiment is that individualized lamps have to be used to determine unique installation positions.

A method for starting up a system having lamps distributed over a number of rooms from a central command unit is described in WO 96/00459 A1. All the lamps already have a source address before installation and are installed without taking account of said source addresses. After installation the source addresses are called up one after the other and the associated consumers are asked to identify themselves. When the selected consumer is identified, a preset operating address is transmitted to it. This method is then repeated with other selected lamps, until all the lamps have an operating address. The lamps can then be called up at this operating address specifically in respect of the installation site and in groups.

SUMMARY

According to various embodiments, a method for starting up a lighting system may have a number of lamps and a central control system, which allows start-up in the shortest possible time regardless of the type of lamps.

According to an embodiment, a method for starting up a lighting system having a plurality of lamps and a central control system for actuating the lamps, each lamp first being associated with an identification code independently of its position and each lamp then being assigned a position code according to its position by a control device, may comprise the steps of: a) dividing the lamps into two arbitrarily selected groups, by switching one group to a first operating state and the other group to a second operating state different from the first operating state, b) selecting one of the lamps and inputting its operating state into the control device, c) selecting the group of lamps having the same operating state as the selected lamp for the further method steps, while the other group is no longer considered, d) if the selected group does not only comprise the selected lamp, carrying out steps a)-d) again with the selected group, e) assigning the position code to the remaining lamp, so that the position code is related uniquely to the identification code, and f) carrying out steps a)-e) for further lamps.

According to a further embodiment, the arbitrarily selected groups can be of roughly equal size. According to a further embodiment, the first operating state can be a switched on state and the second operating state can be a switched off state. According to a further embodiment, the inputting of the operating state of the selected lamp according to method step c) can be effected in each instance by a separate key on the control device for the “on” state and for the “off” state. According to a further embodiment, an acoustic signal can be emitted when the operating state is switched according to step a). According to a further embodiment, a lighting plan of the lighting system can be displayed in the control device, so that the selected lamp can be identified in the lighting plan. According to a further embodiment, a pressure-sensitive display may allow the selected lamp to be identified directly in the graphically displayed lighting plan by pressing the lamp. According to a further embodiment, communication of the control system with the lamps may take place by way of the standard protocol "Digital Addressable Lighting Interface", DALI. According to a further embodiment, the control device can be a mobile device, in particular a laptop or notebook computer. According to a further embodiment, the control device can be connected wirelessly to the control system. According to a further embodiment, a maximum number of cycles for running through the steps a)-e) can be determined according to the number of lamps in the lighting system, the reaching of the maximum cycle number being indicated by an acoustic end signal, which is different from the switching signal. According to a further embodiment, the control device first may obtain the identification codes from the control system and after the position codes have been assigned, they are passed on to the control system.

BRIEF DESCRIPTION OF THE DRAWINGS

The invention is described in more detail, in some instances schematically and not to scale, based on the drawing, in which.

DETAILED DESCRIPTION

Figure 1:
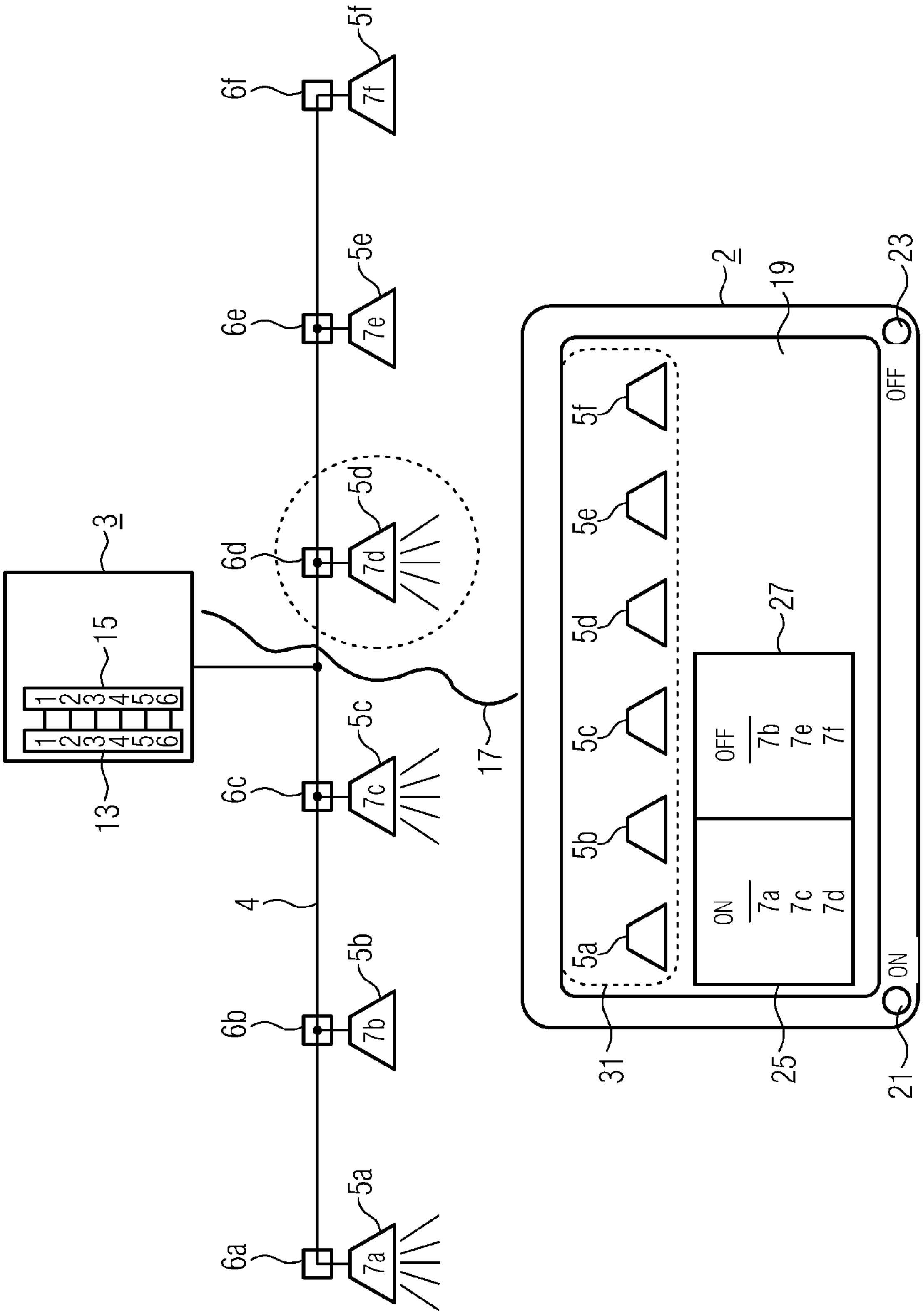
FIG. 1 shows a first method step for starting up a lighting system.
Figure 2:
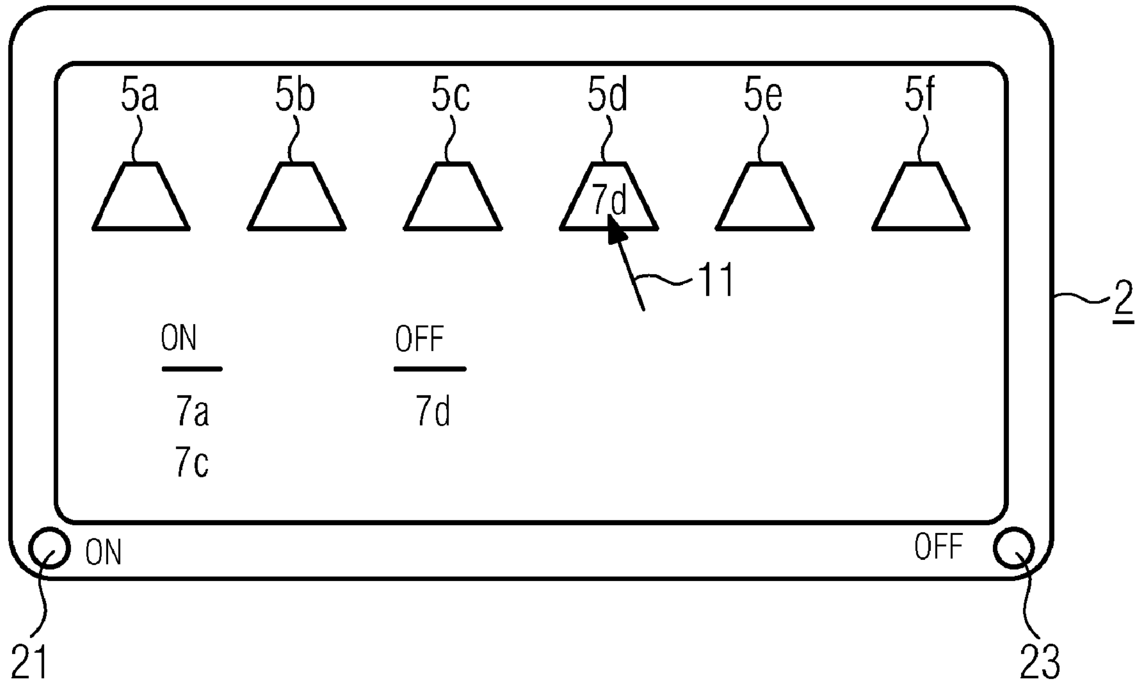
FIG. 2 shows a further method step for starting up the lighting system.

According to various embodiments, in a method for starting up a lighting system having a number of lamps and a central control system for actuation purposes, each lamp first being associated with an identification code independently of its position and each lamp then being assigned a position code according to its position by a control device, the following steps may be carried out one after the other: a) dividing the lamps into two arbitrarily selected groups, by switching one group to a switched on state and the other group to a switched off state, b) selecting one of the lamps and inputting its operating state into the control device, c) selecting the group of lamps having the same operating state as the selected lamp for the further method steps, while the other group is no longer considered, d) if the selected group does not only comprise the selected lamp, carrying out steps a)-d) again with the selected group, e) assigning the position code to the remaining lamp, so that the position code is related uniquely to the identification code, and f) carrying out steps a)-e) for further lamps.

Methods used until now for starting up lighting systems are based either on the possibility of identifying a respective lamp by an individual characteristic or lamps being switched, in no order in respect of their installation position and one after the other, to an operating state which allowed their identification. While in the first mentioned method there is a disadvantageous increase in installation outlay, as each lamp has to be identified individually, there is a greater start-up outlay with the second variant, as a lamp first has to be located, which can be very time-consuming for a more complex lighting system, which may even be distributed over a number of rooms.

In contrast it is possible according to various embodiments to identify lamps one after the other in an appropriate sequence, in other words in particular according to the order of their spatial arrangement, and to link them to their spatial position so that the central control system is given unique identification of a lamp, as a function of its spatial position. An iterative process is followed for this purpose, allowing a gradual isolation of all possible lamps to establish the desired, selected lamp. It is possible to use practically any lamp without special identifying means, as the lamp only has to be switched to a defined operating state, in other words in particular a switched on and switched off state, by the central control system. By inputting the operating state of the selected lamp now present, it is possible to identify any group containing the selected lamp. Only this group is used for a further division into two groups with different operating states. Again the group is selected, which has the operating state corresponding to the selected lamp. Finally only the selected lamp is left. This is known in the control device and the control system via the association of the identification code of the control system. The spatial position known by means of lamp selection is now assigned by means of a position code, so that there is now unique association of the identification code with the position code. In other words the control system now knows both the identification code for actuating the lamp and the spatial position of this lamp. It is therefore now possible to set different, spatially ordered lighting states of the lighting system by means of the central control system, for example by grouping lamps spatially.

The arbitrarily selected groups are preferably of roughly equal size; in particular each group contains half the lamps respectively.

It is also preferable for the first operating state to be a switched on state while the second operating state is a switched off state.

The inputting of the operating state of the selected lamp according to method step c is preferably effected in each instance by a separate key on the control device for the "ON" state and for the "OFF" state. The keys are favorably disposed so that an operator can even input the operating state without looking.

An acoustic switching signal is preferably emitted when the operating state of the lamps is switched. It is thus possible to input the operating state of the selected lamp into the control device without looking further at the control device, since an input request to input said operating state is made at the same time as the acoustic signal. The iterative procedure for identifying the selected lamp therefore becomes very fast, as the input can be made into the control device within a few seconds.

A lighting plan of the lighting system is preferably displayed in the control device, so that the selected lamp can be identified in the lighting plan. An operator can thus assign the position code to the identification code by simple association of the selected lamp directly in the lighting plan. The operator can preferably do this by means of a pressure-sensitive display of the control device, i.e. by touching the selected lamp in the lighting plan directly on the pressure-sensitive display, the system is notified of the position code of the selected lamp, for which the identification code has already been determined by running through the selection steps.

A further option for assigning the position code to the identification code is to run through the lamps gradually in a predetermined sequence, in particularly in a spatially consecutive sequence, i.e. a program predetermines the selected lamp according to the sequence in each instance and thus already has information about the spatial position. After the iterative determination of the identification code assignment of the identification code to the position code can thus take place automatically without a further manual assignment step directly after the last run through the step.

Communication of the control system with the lamps preferably takes place by way of the standard protocol Digital Address of the Lighting Interface (DALI). In a lighting system with the DALI protocol an arbitrary assignment of addresses, i.e. identification codes, to the installed lamps by means of the control system generally takes place after installation, to allow actuation of the lamps. This random distribution of the identification codes means that there is no association of the lamps with their respective spatial position. This then takes place using the method described in more detail above.

The control device is preferably a mobile device, in particular a laptop or notebook computer. For lighting systems in very large rooms specifically or those in which the lamps are distributed over a number of rooms in some instances it is no longer possible to select a lamp from a central point. A mobile control device thus allows a start-up operator to move close to the selected lamp, in order then to be able to input the operating state, which may change during the course of the iterative steps, into the control device. Installation software containing the lighting plan is then supplied to a laptop or notebook computer for example. The inputs can also be made by way of a mouse, touch pad or the like.

It is also preferable for the control device to be connected wirelessly to the control system, in particular by way of wireless LAN. The information about which lamp is associated with which operating state group is then available on the control device and the control system is notified of the operating state of the selected lamp so that only the selected group is used by the control system for further actuations.

A maximum number of cycles for running through the steps a)-e) is preferably determined according to the number of lamps in the lighting system, the reaching of the maximum cycle number being indicated by an end signal, which is different from the switching signal. Such an acoustic reproduction of the step cycle allows the connection of the control device to the control system to be reduced to a minimum, in other words only the signal for the operating state of the selected lamp has to be transmitted to the control system for each step. It would be possible here for example for an acoustic information system already present in a building to be used to transmit the acoustic signals. Keys respectively present in the room to indicate the operating state of the selected lamp in such a room mean that there is no need for a mobile control device at all. The start-up operator only considers the current lamp according to the predetermined sequence and inputs its operating state according to the acoustic signals until the sequence has been run through in its entirety.

FIG. 1 shows a lighting system 1. A series of lamps 5*a* to 5*f* are connected to a central control system 3. Each lamp 5 has a respective electronic ballast 6. The lamps 5 are connected to the central control system 3 by way of the electronic ballast 6 and a communication line 4. The communication line 4 is configured as a bus system, so that communication can be implemented by means of the standard protocol Digital Address of the Lighting Interface (DALI). After installation of the lighting system 1 the central control system 3 is used to associate a random address, i.e. an identification code 7, with each of the lamps 5 via the respective ballast 6. The identification codes are stored in a storage region 13 of the control system 3. A further storage region 15 of the control system 3 is used to store position codes, which indicate the spatial position of each lamp 5. To start up the lighting system 1 it is necessary to associate a position code uniquely with the identification code 7 of a respective lamp 5. A control device 2 is used for this purpose. The control device 2 has a pressure-sensitive display 19. The control device 2 also has an "ON" switch 21 and an "OFF" switch 23. The control device 2 shows a lighting plan 31 graphically on the display 19. It is also displayed in a display region 25 which of the lamps 5 are in a switched on operating state. In a further display region 27 the lamps in the switched off operating state are displayed. In the display regions 25 and 27 the lamps are only displayed with their identification codes. The object of starting up is now to assign a unique position code to each of these identification codes. The following steps are implemented for this purpose:

All the lamps 5 are divided into two groups by random selection. In the example shown here each group comprises three lamps giving a total number of six lamps in the lighting system 1. The first group 25 is switched on, while the second group 27 is switched off. A start-up operator, who looks at the lamps 5 one after the other with the mobile control device 2, inputs the current operating state of a first selected lamp. In the example shown here this is the lamp 5*d*. This is in the switched on state. The start-up operator thus inputs this operating state by actuating the switch 21. The lamps of the group 25, which are in the switched on state, are then used for the further method steps, while the lamps of the group 27 are not further considered. The remaining lamps are divided into two groups again. After random selection by the system in the example shown the lamps 7*a* and 7*c* are in the switched on state while the lamp 7*d* is switched off. After this switching process an acoustic signal is emitted, so that the start-up operator identifies the implementation of the switching process. In the example shown he/she would see from the switching off of the lamp 7*d*, i.e. the lamp just selected by him/her, that a switching process has taken place. However the random selection means that such switching of the operating state of the selected lamp 7*d* does not necessarily have to take place. The start-up operator inputs the operating state of the selected lamp 7*d* into the system again, this time using the switch 23. Since the group selected in this manner only comprises the selected lamp 7*d*, unique identification of the selected lamp is possible. The start-up operator now presses the lamp 5*a* in the lighting plan 31 using the pressure-sensitive display 19. As a result a unique position code is assigned to the identification code 7*d* of the lamp 5*d* and stored in the storage region 15 of the control system 3. The start-up operator now proceeds to the next lamp, e.g. 5*e* in the lighting system 1, and implements the described method steps once again. More lamps are of course frequently present in a lighting system, so that more frequent inputting of the operating state of the selected lamp is necessary for each lamp. A maximum number of 64 lamps is typically provided for a lighting system in a DALI system. Therefore maximum six inputs are necessary to identify the selected lamp uniquely. However with the described method such inputting can be carried out very quickly, i.e. in a few seconds. The acoustic indication of the switching of the operating states indeed means that the start-up operator no longer has to look at the control device 2 to undertake the inputs. The control device 2 is connected to the control system 3 by way of a wireless communication connection 17. This communication connection 17 allows the control system 3 to transmit identification codes and the switching states of the lamps 5 to the control device 2, as well as to transmit the respective operating states of the selected lamps and the details of the selected lamp in the lighting plan 31 to the control system 3.

It is possible to use this method to start up a lighting system 1 in a very simple manner, without providing the lamps 5 with additional identification means. A commercially available lamp can thus be installed in the lighting system 1 without further technical measures.

The invention claimed is:

1. A method for determining positions of individual lamps in a lighting system with a central control system for actuating the lamps, wherein after installation of the lamps, the central control system assigns to each lamp an identification code independently of its position, the method comprising the steps of:

a) dividing the lamps into two arbitrarily selected groups, by switching one group to a first operating state and the other group to a second operating state different from the first operating state, b) selecting one of the lamps, wherein the position of the selected lamp is known, and inputting its operating state into a control device in communication with the central control system, c) selecting the group of lamps having the same operating state as the selected lamp for the further method steps, while the other group is no longer considered, d) if the selected group does not only comprise the selected lamp, carrying out steps a)-d) again with the selected group until a single lamp remains in the group, e) assigning the position code to the remaining lamp, so that the position code is related uniquely to the previously assigned identification code, f) carrying out steps a)-e) for further lamps.

2. The method according to claim 1, wherein the arbitrarily selected groups are of roughly equal size.

3. The method according to claim 1, wherein the first operating state is a switched on state and the second operating state is a switched off state.

4. The method according to claim 1, wherein the inputting of the operating state of the selected lamp according to method step c) is effected in each instance by a separate key on the control device for the "on" state and for the "off" state.

5. The method according to claim 1, wherein an acoustic signal is emitted when the operating state is switched according to step a).

6. The method according to claim 1, wherein a lighting plan of the lighting system is displayed in the control device, so that the selected lamp can be identified in the lighting plan.

7. The method according to claim 6, wherein a pressure-sensitive display allows the selected lamp to be identified directly in the graphically displayed lighting plan by pressing the lamp.

8. The method according to claim 1, wherein communication of the control system with the lamps takes place by way of the standard protocol "Digital Addressable Lighting Interface", DALI.

9. The method according to claim 1, wherein the control device is a mobile device, a laptop or a notebook computer.

10. The method according to claim 9, wherein the control device is connected wirelessly to the control system.

11. The method according to claim 4, wherein a maximum number of cycles for running through the steps a)-e) is determined according to the number of lamps in the lighting system, the reaching of the maximum cycle number being indicated by an acoustic end signal, which is different from the switching signal.

12. The method according to claim 9, wherein the control device first obtains the identification codes from the control system and after the position codes have been assigned, they are passed on to the control system.

13. A lighting system comprising a plurality of lamps and a central control system for actuating the lamps, wherein the lighting system is configured to assign each lamp with an identification code independently of its position during an initialization routine wherein for determination of a position of each lamp, the central control system is further operable:

a) to divide the lamps into two arbitrarily selected groups, by switching one group to a first operating state and the other group to a second operating state different from the first operating state, b) to select one of the lamps, wherein the position of the selected lamp is known, and input its operating state into a control device which is in communication with the central control system, c) to select the group of lamps having the same operating state as the selected lamp for the further operations, while the other group is no longer considered, d) if the selected group does not only comprise the selected lamp, to carry out functions a)-d) again with the selected group until a single lamp remains in the group, e) to assign the position code to the remaining lamp, so that the position code is related uniquely to the previously assigned identification code, and f) to carry out functions a)-e) for further lamps.

14. The system according to claim 13, wherein the arbitrarily selected groups are of roughly equal size.

15. The system according to claim 13, wherein the first operating state is a switched on state and the second operating state is a switched off state.

16. The system according to claim 13, wherein the inputting of the operating state of the selected lamp according to function c) is effected in each instance by a separate key on the control device for the "on" state and for the "off" state.

17. The system according to claim 13, wherein an acoustic signal is emitted when the operating state is switched according to function a).

18. The system according to claim 13, wherein a lighting plan of the lighting system is displayed in the control device, so that the selected lamp can be identified in the lighting plan.

19. The system according to claim 18, wherein a pressure-sensitive display allows the selected lamp to be identified directly in the graphically displayed lighting plan by pressing the lamp.

20. The system according to claim 13, wherein communication of the control system with the lamps takes place by way of the standard protocol "Digital Addressable Lighting Interface", DALI.

* * * * *